W. C. Gifford,
Cattle Stanchion.
No. 102,804. Patented May 10, 1870.
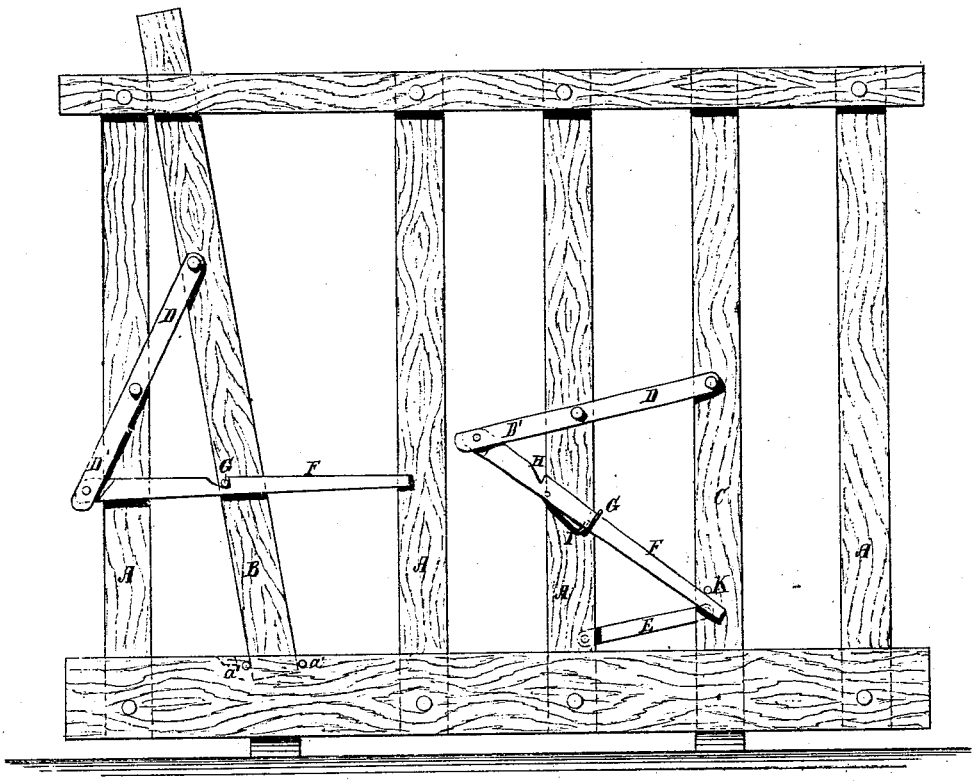

United States Patent Office.

WALTER C. GIFFORD, OF JAMESTOWN, NEW YORK.

Letters Patent No. 102,804, dated May 10, 1870.

IMPROVEMENT IN STANCHIONS FOR CATTLE.

The Schedule referred to in these Letters Patent and making part of the same.

*To all whom it may concern:*

Be it known that I, WALTER C. GIFFORD, of Jamestown, in the county of Chautauqua and State of New York, have invented a new and improved Cattle-Rack; and I do hereby declare that the following is a full, clear, and exact description thereof, which will enable others skilled in the art to make and use the same, reference being had to the accompanying drawing forming part of this specification.

The invention relates to cattle-racks and consists in the improvement hereafter specified in claim.

The drawing represents a side elevation of a cattle-rack, showing my improved arrangement of means for operating the stanchions.

A are the fixed stanchions, and B C the movable ones.

The one, C, is connected to the fixed stanchion by the bars D E, pivoted to each, so that, in moving it to open the space between it and the next stanchion, A, to the right, for the admission of the animal's head to reach the food beyond, it will be raised also, and, to hold it in the open and raised position, the bar D has a prolongation, D', at the opposite side of the stanchion to which it is connected, to the end of which a notched arm, F, is jointed, which slides through a staple, G, and the notch H hooks onto the pin K, so that the weight of the stanchion will retain it in the hooked position; and, when it is so hooked, the arm F will project across the wide open space for the animal's head to pass between the stanchions, so that, when he reaches down to the food, his neck will force the arm down and disconnect it from the pin, and allow the stanchion to fall and secure the animal.

I is a spring catch on the arm F, springing out above the staple, when the stanchion is in the closed position, and locking the arm to hold it there.

The stanchion B is connected to its fixed stanchion A by only one bar, D, above the center, and the foot is confined between two pins $a$ $a'$, so that the upper end only will swing up against the stanchion to which it is connected.

The arm F, connected to the extension D' is hooked onto the pin G' to hold the stanchion B up, and to be detached by the animal, to let it fall.

Having thus described my invention,

I claim as new and desire to secure by Letters Patent—

1. The fixed stanchion A, movable stanchion C, pivoted bars D D' E, notched arm F, staple G, spring catch I, and pin K, all relatively constructed and arranged as and for the purpose described.

2. The combination of lever D D', notched lever F H, and staple G, as and for the purpose described.

W. C. GIFFORD.

Witnesses:
T. S. BLY,
A. C. ROBERTSON.